US009148917B2

(12) United States Patent
Omi et al.

(10) Patent No.: US 9,148,917 B2
(45) Date of Patent: Sep. 29, 2015

(54) LOAD DRIVING DEVICE AND ELECTRONIC DEVICE USING THE SAME

(75) Inventors: Masaki Omi, Kyoto (JP); Fumihiko Terasaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 723 days.

(21) Appl. No.: 13/354,387

(22) Filed: Jan. 20, 2012

(65) Prior Publication Data

US 2012/0187858 A1    Jul. 26, 2012

(30) Foreign Application Priority Data

Jan. 20, 2011   (JP) ................................. 2011-009421

(51) Int. Cl.
  *H05B 37/02*   (2006.01)
  *H05B 33/08*   (2006.01)

(52) U.S. Cl.
  CPC ........... *H05B 33/0815* (2013.01); *Y02B 20/347* (2013.01)

(58) Field of Classification Search
  CPC .......... H05B 33/0815; H05B 33/0827; H05B 33/0842; H05B 33/0818; H05B 33/0851; H05B 37/02; H05B 41/2828; H05B 33/083; H05B 41/295; H05B 41/36; H05B 41/2827; H05B 41/2883; H05B 41/2886; H05B 41/38
  USPC .......... 315/224; 363/222, 224, 282, 284, 285, 363/288, 901, 49, 24, 21.02
  See application file for complete search history.

(56) References Cited

U.S. PATENT DOCUMENTS 7,977,889 B2 * 7/2011 Kumagai et al. ............. 315/247
8,169,207 B2 * 5/2012 Omi ............................. 323/285
2006/0284567 A1 * 12/2006 Huynh et al. ................. 315/246
2009/0039853 A1 * 2/2009 Omi ............................. 323/284
2009/0278521 A1 * 11/2009 Omi et al. .................... 323/288
2011/0221412 A1 * 9/2011 Li et al. ........................ 323/283

FOREIGN PATENT DOCUMENTS

| JP | 2001-267093 | 9/2001 |
| JP | 2009-044779 | 2/2009 |
| JP | 2010-182883 | 8/2010 |
| JP | 2011-009701 | 1/2011 |

OTHER PUBLICATIONS

Japanese Patent Office, official communication in Japanese Patent Application No. 2011-009421 (Sep. 9, 2014) (and partial translation).

* cited by examiner

*Primary Examiner* — Douglas W Owens
*Assistant Examiner* — Monica C King
(74) *Attorney, Agent, or Firm* — Fish & Richardson P.C.

(57) ABSTRACT

A load driving device includes a switch element configured to generate an output voltage to a load from an input voltage depending on an ON/OFF operation thereof, a switch controller configured to control the ON/OFF operation of the switch element such that a feedback voltage obtained by subtracting a dropped voltage of the load from the output voltage and a predetermined reference voltage are maintained to be consistent, and a variable current source configured to perform ON/OFF controlling of a driving current flowing to the load in response to a driving current control signal. When the switch element is in an ON state at an OFF timing of the driving current, the switch controller maintains the switch element in the ON state thereafter, and turns off the switch element when the ON period of the switch element reaches a predetermined period.

11 Claims, 11 Drawing Sheets

LOAD DRIVING DEVICE AND ELECTRONIC DEVICE USING THE SAME

CROSS-REFERENCE TO RELATED APPLICATIONS

This application is based upon and claims the benefit of priority from Japanese Patent Application No. 2011-009421, filed on Jan. 20, 2011, the entire contents of which are incorporated herein by reference.

TECHNICAL FIELD

The present disclosure relates to a load driving device for controlling driving of a load, and an electronic device using the same.

BACKGROUND

Figure 12:
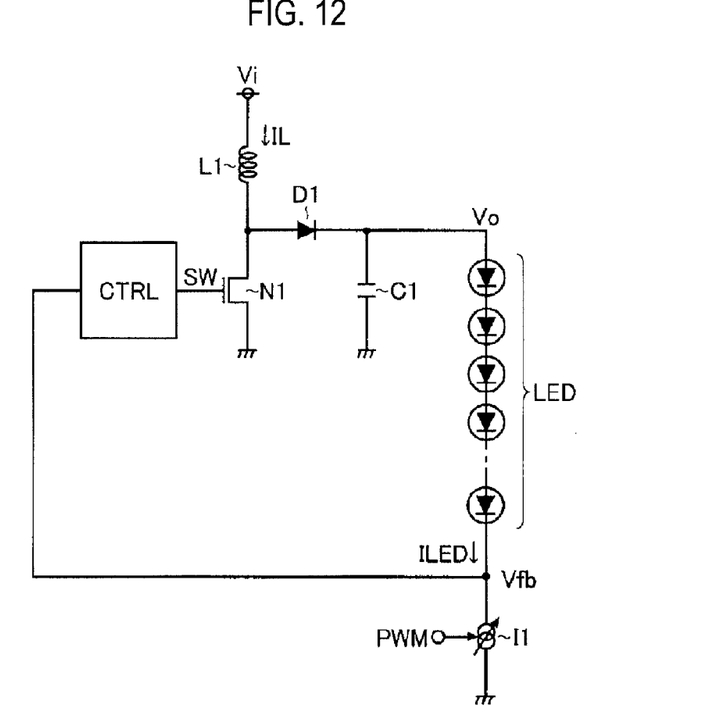
FIG. 12 is a circuit block diagram illustrating a first related art example of an LED driving device.

FIG. 12 is a circuit block diagram of a first related art example of a light emitting diode (LED) driving device. The LED driving device of the first related art example is configured to control an output feedback of a switching regulator (which is a power circuit for generating an output voltage Vo applied to anodes of an array of LEDs from an input voltage Vi) based on a feedback voltage Vfb extracted from cathodes of the array of LEDs. Simultaneously, the conventional LED driving device executes dimming of the array of LEDs by pulse width modulation (PWM)-controlling a driving current ILED (LED current) flowing through the array of LEDs.

Figure 13:
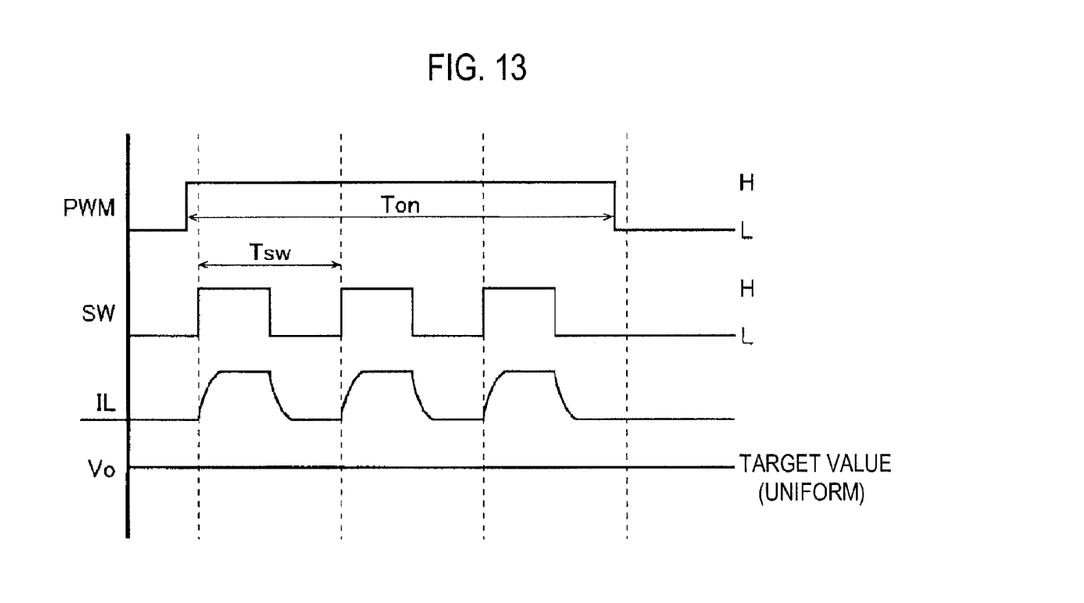
FIG. 13 is a time chart illustrating a state in which a step-up operation is sufficient.

In the LED driving device of the first related art example, when an ON period Ton of a dimming signal PWM is longer than a driving period Tsw of a switch signal SW, the ON period of the switch signal SW can be sufficiently secured without causing shortage of an inductor current IL, and an output voltage Vo can be maintained at a target value (see FIG. 13).

Figure 14:
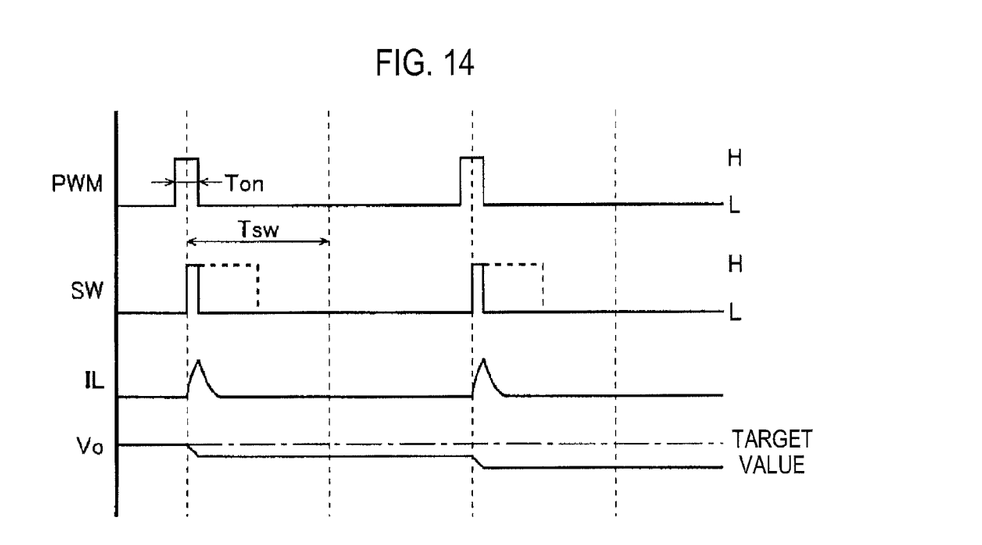
FIG. 14 is a time chart illustrating a state in which a step-up operation is insufficient.

However, when the ON period Ton of the dimming signal PWM is shorter than the driving period Tsw of the switch signal SW, the ON period of the switch signal SW cannot be sufficiently secured and the inductor current IL is insufficient to lower the output voltage Vo from the target value, failing to allow the driving current ILED to flow to the array of LEDs (see FIG. 14).

Figure 15:
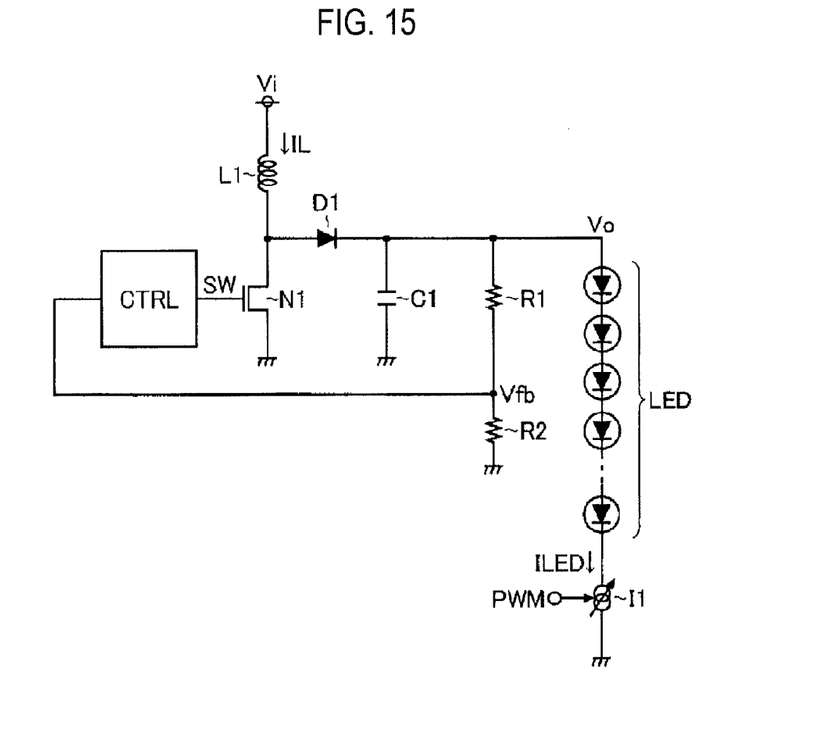
FIG. 15 is a circuit block diagram illustrating a second related art example of the LED driving device.

FIG. 15 is a circuit block diagram of a second related art example of an LED driving device. The LED driving device of the second related art example is configured to control output feedback of a switching regulator based on a feedback voltage Vfb obtained by dividing an output voltage Vo. Simultaneously, the LED driving device executes dimming of an array of LEDs by PWM-controlling a driving current ILED flowing through the array of LEDs. In this manner, when controlling the output feedback of the switching regulator is completely independent from controlling the dimming of the array of LEDs, the output voltage Vo can be maintained at a target value, without having to follow an ON period Ton of a dimming signal PWM. However, in the LED driving device of the second related art example, unlike that of the first related art example, since the target value of the output voltage Vo is set to be high in consideration of the fact that a forward dropped voltage VF of the array of LEDs is not even, power conversion efficiency is poor.

Meanwhile, the technical problem of the related art has been described by using a LED driving device as an example, but other load driving devices (e.g., a power circuit for supplying power to a pulse-driven load or the like) also have the same problem.

SUMMARY

The present disclosure provides some embodiments of a load driving device capable of effectively and stably controlling driving of a load, and an electronic device using the same.

According to one embodiment of the present disclosure, there is provided a load driving device including a switch element, a switch controller and a variable current source. The switch element is configured to generate an output voltage to a load from an input voltage depending on an ON/OFF operation thereof. The switch controller is configured to control the ON/OFF operation of the switch element such that a feedback voltage obtained by subtracting a dropped voltage of the load from the output voltage and a predetermined reference voltage are consistent. The variable current source is configured to perform ON/OFF controlling of a driving current flowing to the load in response to a driving current control signal. When the switch element is in an ON state at an OFF timing of the driving current, the switch controller maintains the switch element in the ON state thereafter, and turns off the switch element when an ON period of the switch element reaches a predetermined period.

In one embodiment, the switch controller initiates ON/OFF controlling of the switch element in synchronization with an ON timing of the driving current.

In one embodiment, the switch controller includes an error amplifier, a sample/hold unit, an oscillator, a first comparator and an RS flip-flop. The error amplifier is configured to generate an error signal depending on a difference between the feedback voltage and the predetermined reference voltage. The sample/hold unit is configured to sample the error signal during an ON period of the driving current and, during an OFF period of the driving current, hold a value of an error signal sampled immediately before the driving current is turned OFF. The oscillator is configured to generate a slope signal, a set signal, and a duty lock signal at a predetermined driving period. The first comparator is configured to compare an output signal from the sample/hold unit and the slope signal to generate a reset signal. The RS flip-flop is configured to generate a switch signal depending on the set signal, the reset signal, and the duty lock signal and supply the generated switch signal to the switch element.

In one embodiment, the RS flip-flop sets the switch signal to an ON logical level according to a pulse edge of the set signal, and resets the switch signal to an OFF logical level according to one of pulse edges of the reset signal and the duty lock signal.

In one embodiment, the oscillator initiates generation of the slope signal, the set signal, and the duty lock signal in synchronization with the ON timing of the driving current.

In one embodiment, the oscillator stops pulse generation of the set signal in synchronization with the OFF timing of the driving current, and executes pulse generation of a next period with respect to the duty lock signal, and then stops the pulse generation.

In one embodiment, the switch controller further includes a second comparator and a sample/hold controller. The second comparator is configured to generate a comparison signal indicating whether or not the feedback voltage is lower than a predetermined threshold voltage. The sample/hold controller is configured to control the operation of the sample/hold unit depending on the driving current control signal and the comparison signal.

In one embodiment, the sample/hold controller releases a hold state of the sample/hold unit when the feedback voltage is lower than the predetermined threshold voltage after an ON operation of the driving current is instructed.

In one embodiment, if the feedback voltage is not lower than the predetermined threshold voltage when an OFF operation of the driving current is instructed in a current period, the sample/hold controller releases the hold state of the sample/hold unit when the ON operation of the driving current is instructed in a next period. Further, if the feedback voltage is lower than the predetermined threshold voltage when the OFF operation of the driving current is instructed in the current period, the sample/hold controller releases the hold state of the sample/hold unit when the feedback voltage is lower than the predetermined threshold voltage after the ON operation of the driving current is instructed in the next period.

According to another embodiment of the present disclosure, there is provided an electronic device including a load, and the load driving device stated above for controlling driving of the load.

In this embodiment, the load is a light emitting diode.

DETAILED DESCRIPTION

Figure 1:
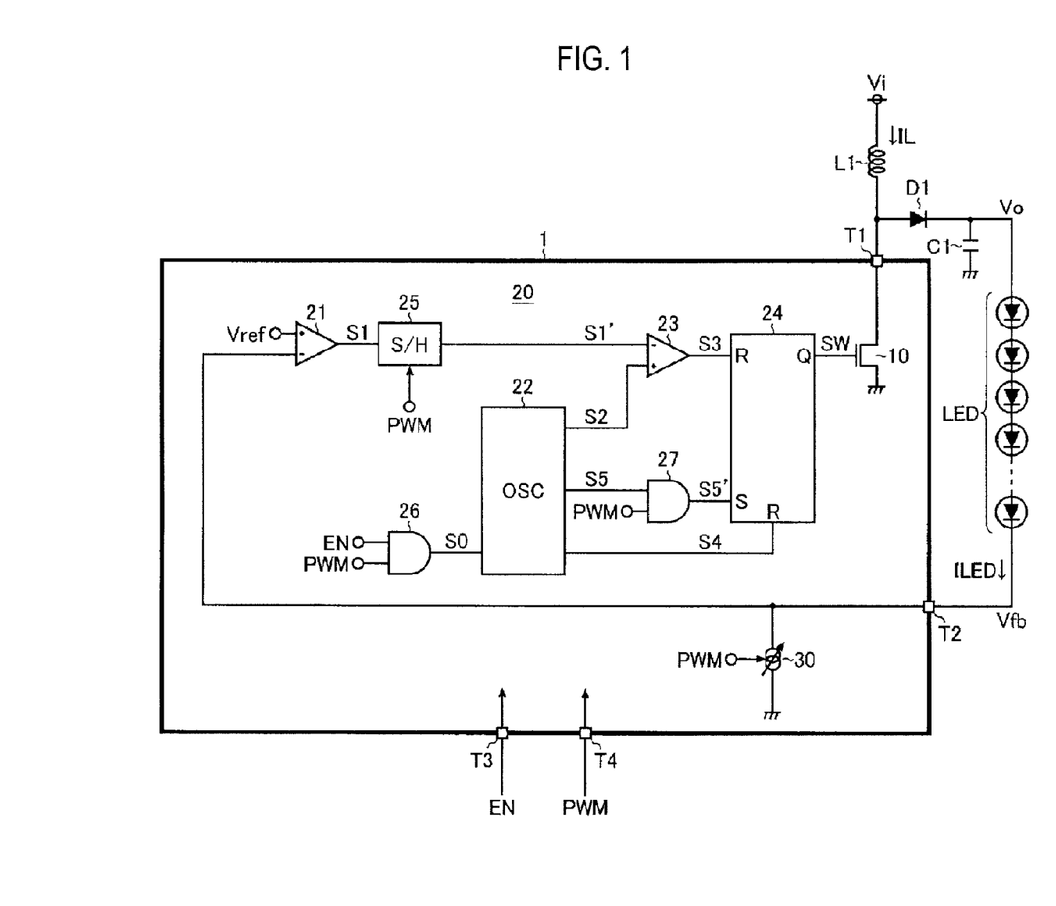
FIG. 1 is a circuit block diagram illustrating a first embodiment of an electronic device according to the present disclosure.

A first embodiment of the present disclosure will now be described in detail with reference to the drawings.
<First Embodiment>
FIG. 1 is a circuit block diagram illustrating a first embodiment of an electronic device according to the present disclosure. The electronic device according to the present embodiment includes an array of light emitting diodes (LEDs) and an LED driving device 1.

The array of LEDs is formed by connecting n number of LEDs (each forward falling voltage VF) in series. The array of LEDs may be used as, for example, a backlight for irradiating the rear of a liquid crystal display panel of the electronic device.

The LED driving device 1, which is a semiconductor integrated circuit device (a so-called LED driver IC) for controlling driving (power supplying and dimming controlling) of the array of LEDs, includes a switch element 10, a switch controller 20, and a variable current source 30. Further, the LED driving device 1 includes external terminals T1 to T4 to establish an electrical connection with the exterior. Meanwhile, besides the foregoing circuit block, for example, a protection circuit block (a voltage drop protection circuit, an overvoltage protection circuit, an overcurrent protection circuit, a temperature production circuit, a short protection circuit, and the like) may be combined into the LED driving device 1.

Besides the array of LEDs, an inductor L1, a diode D1, and a capacitor C1 are connected as discrete elements which form a step-up output terminal to the LED driving device 1 at an outer side of the LED driving device 1. A first terminal of the inductor L1 is connected to an application terminal of an input voltage Vi. A second terminal of the inductor L1 and an anode of the diode D1 are all connected to the external terminal T1. A cathode of the diode D1 is connected to an anode of the array of LEDs and a first terminal of the capacitor C1. A second terminal of the capacitor C1 is connected to a ground terminal. A cathode of the array of LEDs from which a feedback voltage Vfb is extracted is connected to the external terminal T2. The external terminal T3 is connected to an application terminal of an enable signal EN. The external terminal T4 is connected to an application terminal of a dimming signal PWM.

The switch element 10 in FIG. 1 is an output power transistor (N channel type metal oxide semiconductor field effect transistor (MOSFET)) for generating an output voltage Vo to the array of LEDs from the input voltage Vi by driving energy storage elements (inductor L1 and capacitor C1) depending on an ON/OFF operation thereof.

The switch controller 20 is a circuit block for controlling ON/OFF operation of the switch element 10 such that the feedback voltage Vfb obtained by subtracting the forward dropped voltage (n×VF) of the entire array of LEDs from the output voltage Vo and a predetermined reference voltage Vref are consistent. The switch controller 20 includes an error amplifier 21, an oscillator (OSC) 22, a comparator 23, an RF flip-flop 24, a sample/hold unit 25, and AND gates 26 and 27.

The error amplifier 21 generates an error signal S1 depending on a difference between the feedback voltage Vfb applied to an inverting input terminal (−) and the predetermined reference voltage Vref (e.g., 0.5 V) applied to a non-inverting input terminal (+). A voltage level of the error signal S1 is increased if the feedback voltage Vfb is lower than the reference voltage Vref, and is decreased if the feedback voltage Vfb is close to the reference voltage Vref.

The oscillator 22 generates a slope signal S2, a set signal S5, and a duty lock signal S4 (a maximum duty limiting signal) by a predetermined driving period Tsw. The slope signal S2 is a pyramidal wave (sawtooth wave), and the set signal S5 and the duty lock signal S4 are square waves. The oscillator 22 starts to generate the slope signal S2, the set signal S5, and the duty lock signal S4 in synchronization with an ON timing of the driving current ILED (rising edges of a logical conjunction signal S0). In addition, the oscillator 22 stops pulse generation of the slope signal S2 and the set signal S5 in synchronization with an OFF timing of the driving current ILED (falling edges of the logical conjunction signal S0), and executes pulse generation of a next period with respect to the duty lock signal S4, and then stops the pulse generation. The operation of the oscillator 22 will be described in detail later.

The comparator 23 compares a sample/hold signal S1' (equivalent to the error signal S1) applied to the inverting input terminal (−) and the slope signal S2 applied to the non-inverting input terminal (+) to generate a reset signal S3. The logical level of the reset signal S3 is a low level when a voltage value of the sample/hold signal S1' is higher than that of the slope signal S2, and is a high level when the voltage value of the sample/hold signal S1' is lower than that of the slope signal S2 (see FIG. 2).

The RS flip-flop 24 generates a switch signal SW depending on a logical conjunction signal S5' (equivalent to the set signal S5), the reset signal S3 and the duty lock signal S4, and supplies the generated switch signal SW to the switch element 10. More specifically, the RS flip-flop 24 sets the switch signal SW to a high level according to rising edges of the logical signal S5', and resets the switch signal SW to a low level according to either one of respective rising edges of the reset signal S3 and the duty lock signal S4 which has been first input (see FIG. 2).

The sample/hold unit 25 samples the error signal S1 during an ON period of the driving current ILED (a high level period of the dimming signal PWM), and holds a sampling value immediately before an OFF operation during the OFF operation of the driving current ILED (a low level period of the dimming signal PWM) to generate the sample/hold signal S1'. With such a configuration, when the dimming signal PWM is increased to a high level from a low level, a step-up operation of the output voltage Vo can be resumed based on the sampling value immediately before the OFF operation of the driving current ILED, whereby the output voltage Vo can be maintained at a target value while executing the PWM dimming.

The AND gate 26 logically operates the enable signal EN (a driving availability/unavailability control signal of oscillator 22) and the dimming signal PWM to generate a logical conjunction signal SO. Thus, when the dimming signal PWM has a high level, the logical conjunction signal SO has the same logical level as that of the enable signal EN, and conversely, when the dimming signal PWM has a low level, the logical conjunction signal S0 has a low level, rather than following the logical level of the enable signal EN.

The AND gate 27 logically operates the set signal S5 and the dimming signal PWM to generate the logical conjunction signal S5'. Thus, when the dimming signal PWM has a high level, the logical conjunction signal S5' has the same logical level as that of the set signal S5, and conversely, when the dimming signal PWM has a low level, the logical conjunction signal S5' has a low level, rather than following the logical level of the set signal S5.

The variable current source 30 is connected between the external terminal T2 and a ground terminal, and controls ON/OFF operation of the driving current ILED flowing through the array of LEDs according to the dimming signal PWM (driving current control signal). Meanwhile, in the present embodiment, a high level period of the dimming signal PWM is an ON period of the driving current ILED, and a low level period of the dimming signal PWM is an OFF period of the driving current ILED. Through such PWM controlling, an external current value (average value) of the driving current ILED can be variably controlled, whereby luminescence brightness of the array of LEDs can be arbitrarily adjusted.

<Step-Up Operation in PWM Non-Dimming>

Figure 2:
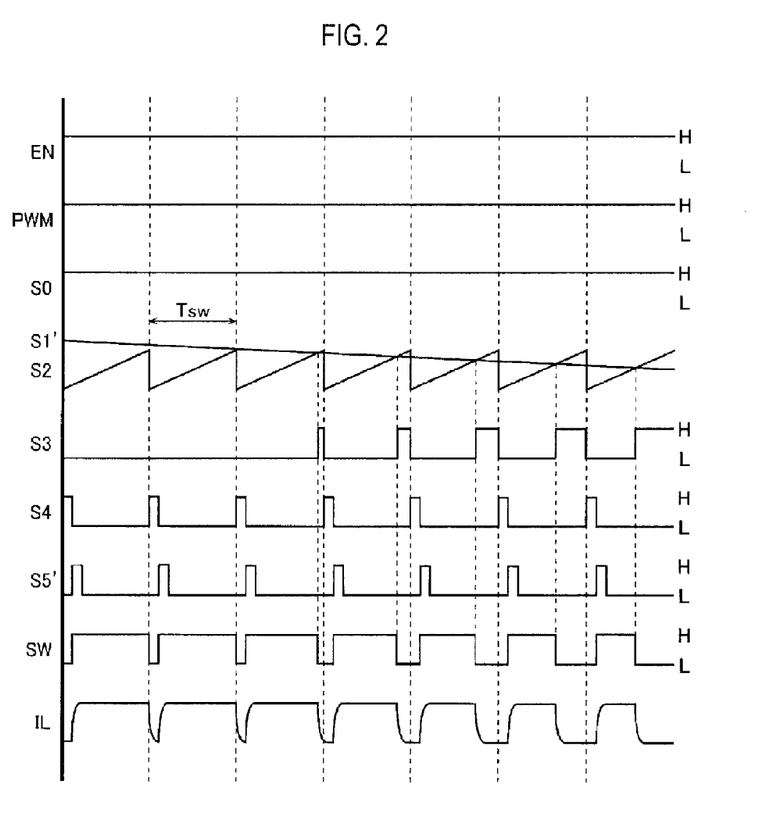
FIG. 2 is a time chart illustrating a first operational example of a light emitting diode (LED) driving device.

FIG. 2 is a time chart illustrating a first operational example of the LED driving device 1, in which the enable signal EN, the dimming signal PWM, the logical conjunction signal S0, the sample/hold signal S1' (equivalent to the error signal S1), the slope signal S2, the reset signal S3, the duty lock signal S4, the logical conjunction signal S5' (equivalent to the set signal S5), the switch signal SW, and the inductor current IL are shown in the order above. Meanwhile, in the first operational example, it is assumed that the dimming signal PWM constantly has a high level (luminance 100%/No PWM dimming).

When the switch element 10 is turned on, the inductor current IL flows through the inductor L1 to a ground terminal through the switch element 10, and electrical energy thereof is accumulated. Meanwhile, when charges have been already accumulated in the capacitor C1 during the ON period of the switch element 10, the current from the capacitor C1 flows to the array of LEDs. Also, at this time, the anode potential of the diode D1 is substantially lowered to a ground potential through the switch element 10, so the diode D1 is reversely biased and a current cannot flow from the capacitor C1 to the switch element 10.

Meanwhile, when the switch element 10 is turned off, the electric energy accumulated in the inductor L1 is discharged by a counter electromotive voltage generated in the inductor L1. At this time, the diode D1 is forwardly biased, so the current flowing through the diode D1 flows as the driving current ILED to the array of LEDs and also flows to the ground terminal through the capacitor C1, charging the capacitor C1. As the foregoing operation is repeated, the output voltage Vo obtained by stepping up the input voltage Vi is supplied to the array of LEDs.

In this manner, in the LED driving device 1, the inductor L1 or the capacitor C1, which is an energy storage element, is driven by controlling an ON/OFF operation of the switch element 10, so the LED driving device 1 serves as a first configuration element of a switching regulator for generating the output voltage Vout by stepping up the input voltage Vin.

<Output Feedback Control>

As described above, the error amplifier 21 generates the error signal S1 depending on the difference between the feedback voltage Vfb and the reference voltage Vref, and the comparator 23 generates the reset signal S3 by comparing the sample/hold signal S1' (equivalent to the error signal S1) and the slope signal S2. Accordingly, a timing at which a rising edge appears in the reset signal S3 becomes delayed as the voltage value of the sample/hold signal S1' is higher, and becomes fast as the voltage value of the sample/hold signal S1' is lower.

In other words, the ON duty (high level rate taken in the driving period Tsw) of the switch signal SW becomes longer as the voltage value of the sample/hold signal S1' is higher, and becomes shorter as the voltage value of the sample/hold signal Si' is lower.

With such a configuration, although the forward falling voltage (n×VF) of the entire array of LEDs is not even, the optimum output voltage Vo (=Vref+n×VF) can be generated constantly to drive the array of LEDs without any problems. Therefore, the output voltage Vo can improve the conversion efficiency by reducing an unnecessary margin. In addition, it can reduce power consumption of an electronic device having the LED driving device 1.

In particular, when the LED driving device 1 according to the present disclosure is employed as an LED driving device mounted in an electronic device using a battery, such as a personal digital/data assistant (PDA), a mobile phone terminal or the like, the battery driving time of the electronic device can be lengthened and the electronic device can become lighter, thinner, and smaller.

<Step-Up Operation in PWM Dimming>

Figure 3:
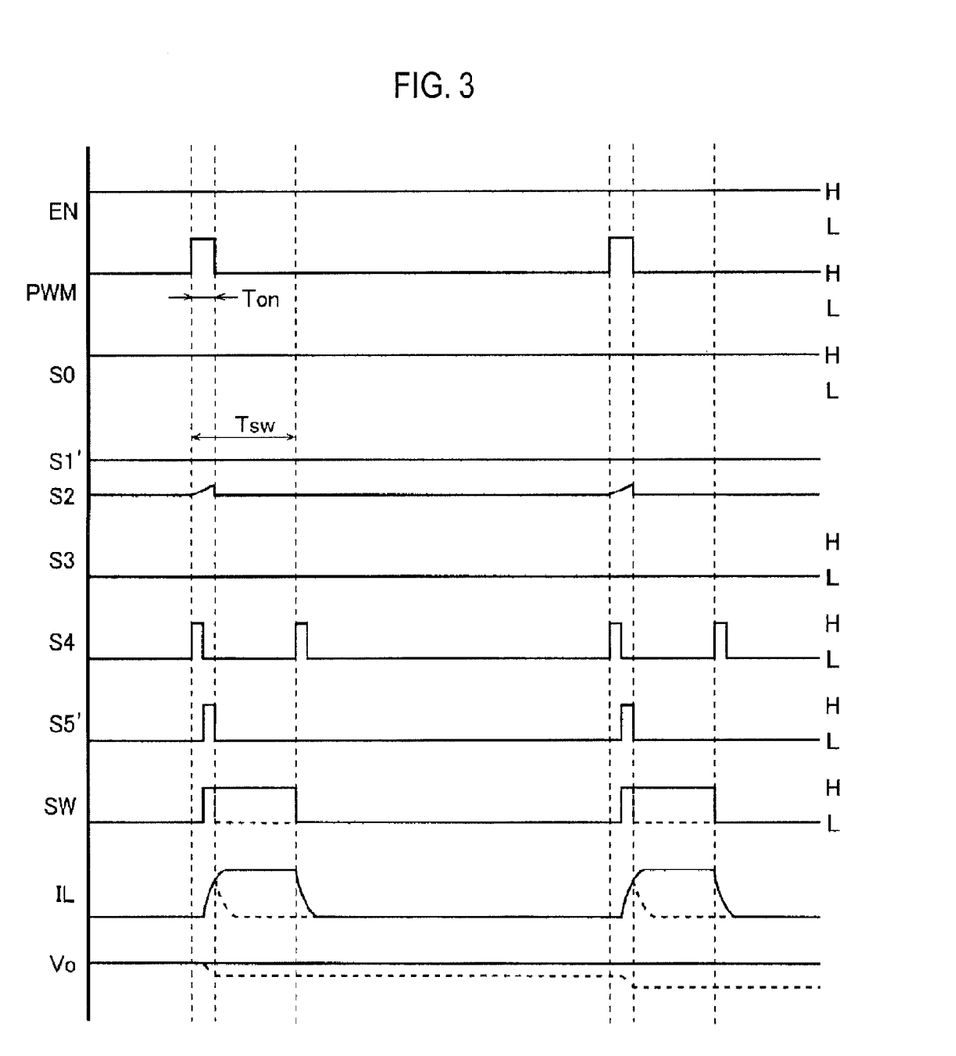
FIG. 3 is a time chart illustrating a second operational example of the LED driving device.

FIG. 3 is a time chart illustrating a second operational example of the LED driving device 1, in which the enable signal EN, the dimming signal PWM, the logical conjunction signal S0, the sample/hold signal S1' (equivalent to the error signal S1), the slope signal S2, the reset signal S3, the duty lock signal S4, the logical conjunction signal S5' (equivalent to the set signal S5), the switch signal SW, the inductor current IL, and the output voltage Vo are illustrated in the order above. Meanwhile, in the second operational example, it is assumed that the ON period Ton of the dimming signal PWM is shorter than the driving period Tsw of the switch signal SW.

As described above, the oscillator 22 starts to generate the slope signal S2, the set signal S5, and the duty lock signal S4 in synchronization with an ON timing of the driving current ILED (rising edges of the logical conjunction signal S0). In the switch controller 20, ON/OFF controlling of the switching element 10 is started in synchronization with the ON timing of the driving current ILED.

Further, the oscillator 22 stops pulse generation of the slope signal S2 and the set signal S5 in synchronization with an OFF timing of the driving current ILED (falling edges of the logical operation signal S0), and executes pulse generation of a next period with respect to the duty lock signal S4, and then stops the pulse generation. Thus, at a point in time at which the falling edge of the dimming signal PWM arrives, a pulse is not generated in the reset signal S3, and when the switch signal SW has a high level, the switch signal SW is maintained at a high level until a pulse of the duty lock signal S4 is generated at a next period. Namely, in the switch controller 20, when the switch element 10 is in an ON state at an OFF timing of the driving current ILED, the switch element 10 is also maintained in the ON state thereafter, and then when the ON period of the switch element 10 arrives at a predetermined period (here, the driving period Tsw), the switch element 10 is turned off.

With such a configuration, although the ON duty of the dimming signal PWM is small, the output voltage Vo can be maintained at the target value without causing shortage of the inductor current IL, and thus, the appropriate driving current ILED can be stably supplied to the array of LEDs.

<Mechanism of Generating Unnecessary Reset Pulse>

Figure 4:
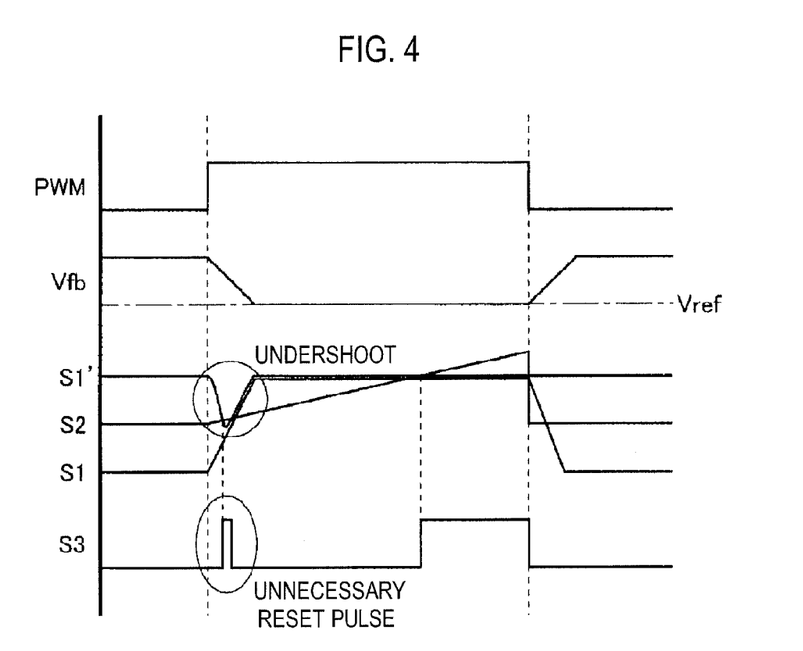
FIG. 4 is a time chart for explaining an unnecessary reset pulse generation mechanism.

FIG. 4 is a time chart for explaining an unnecessary reset pulse generation mechanism, in which the dimming signal PWM, the feedback voltage Vfb, the sample/hole signal S1', the slope signal S2, the error signal S1, and the reset signal S3 are illustrated in the order above.

As described above, in the LED driving device 1, when the dimming signal PWM has a high level, the feedback of the output voltage Vo is executed such that the feedback voltage Vfb and the reference voltage Vref are consistent. With this configuration, an operation before and after the dimming signal PWM is increased from a low level to a high level is considered. When the dimming signal PWM has a low level, since the feedback voltage Vfb is increased up to the vicinity of the output voltage Vo according to halt of the driving current ILED, the error signal S1 has a low voltage level (information indicating that voltage is not required to be stepped up). Also, in this state, when the level of the dimming signal PWM is increased to be high, the driving current ILED flows to the array of LEDs to lower the feedback voltage Vfb to the reference voltage Vref, and accordingly, the error signal S1 is returned to have a high voltage level before the driving current ILED is turned off.

Thus, when the hold state of the sample/hold unit 25 is released immediately when the dimming signal PWM is increased from a low level to a high level, the sample/hold signal S1' has an undershoot unintentionally lower than the slope signal S2, leaving the possibility that an unnecessary pulse is generated in the reset signal S3. When such an unnecessary reset pulse is generated, the switch signal SW is reset to have a low level immediately after the dimming signal PWM is increased to have a high level, so that the foregoing benefits of the present disclosure cannot be sufficiently enjoyed. Hereinafter, a second embodiment which reduces such a problem will be described in detail.

<Second Embodiment>

Figure 5:
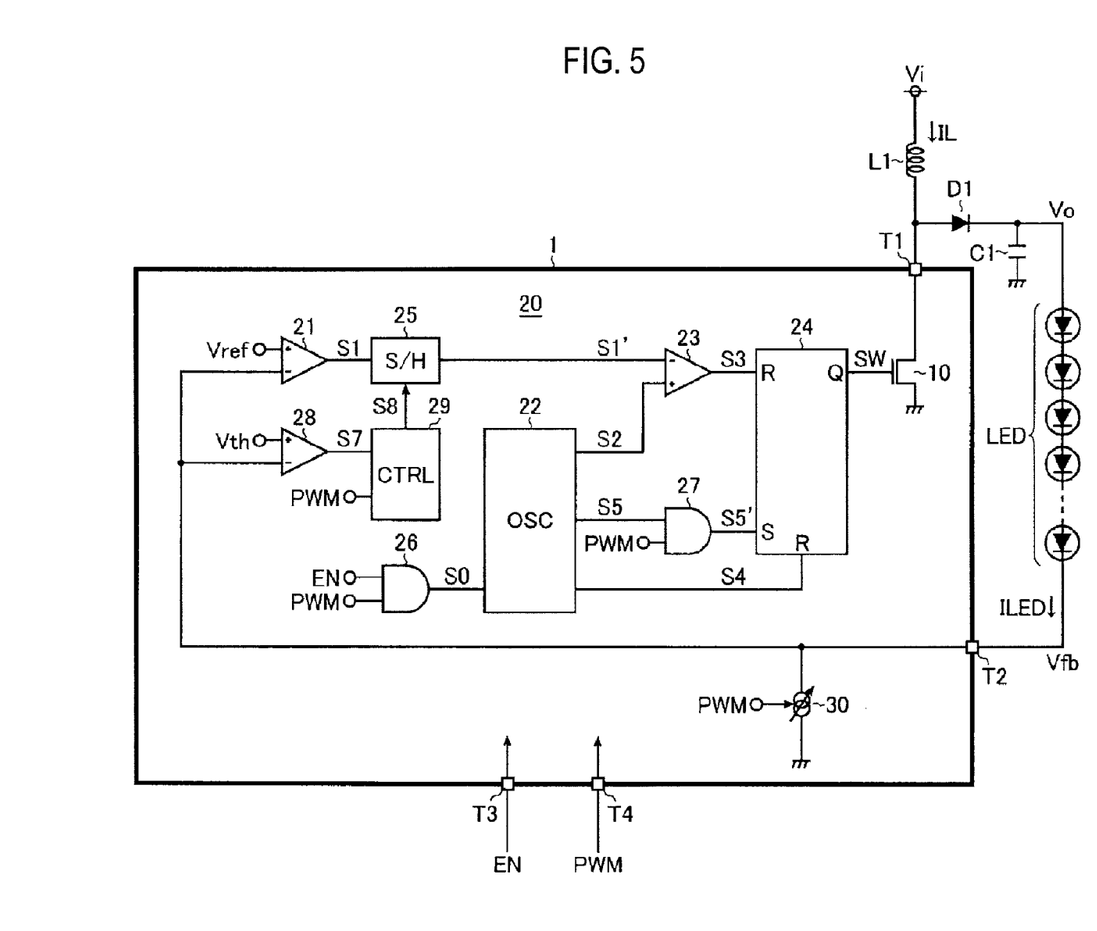
FIG. 5 is a block diagram illustrating a second embodiment of the electronic device according to the present disclosure.

FIG. 5 is a block diagram illustrating a second embodiment of an electronic device according to the present disclosure. The electronic device according to the second embodiment has substantially the same configuration as that of the foregoing first embodiment, and is characterized in that a comparator 28 and a sample/hold controller 29 are newly added as components of the switch controller 20. Thus, the same reference numerals are used for the same components as those of the first embodiment to omit repeated description, and hereinafter, components particular to the second embodiment will be largely described.

The comparator 28 compares the feedback voltage Vfb and a predetermined threshold value Vth (e.g., 1 V) to generate a comparison signal S7. As for the logical level of the comparison signal S7, when the feedback voltage Vfb is higher than the threshold value Vth, the comparison signal S7 has a low level, and conversely, when the feedback voltage Vfb is lower than the threshold value Vth, the comparison signal S7 has a high level.

The sample/hold controller 29 generates a sample/hold control signal S8 based on the dimming signal PWM and the comparison signal S7.

Figure 6:
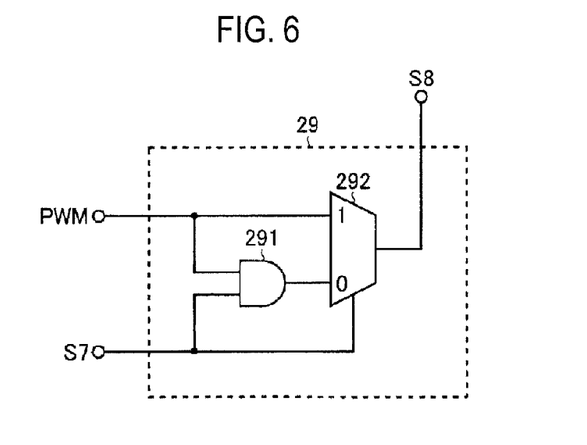
FIG. 6 is a block diagram illustrating a first configuration example of a sample/hold controller.

FIG. 6 is a block diagram illustrating a first configuration example of the sample/hold controller 29. The sample/hold controller 29 of the first configuration example includes an AND gate 291 and a selector 292. A first input terminal of the AND gate 291 is connected to an application terminal of the dimming signal PWM. A second input terminal of the AND gate 291 is connected to an application terminal of the comparison signal S7. A first selection terminal 1 of the selector 292 is connected to an application terminal of the dimming signal PWM. A second selection terminal 0 of the selector 292 is connected to an output terminal of the AND gate 291. An output terminal of the selector 292 is connected to the sample/hold unit 25 (omitted in FIG. 6), as an output terminal of the sample/hold control signal S8. A control terminal of the selector 292 is connected to an application terminal of the comparison signal S7.

Figure 7:
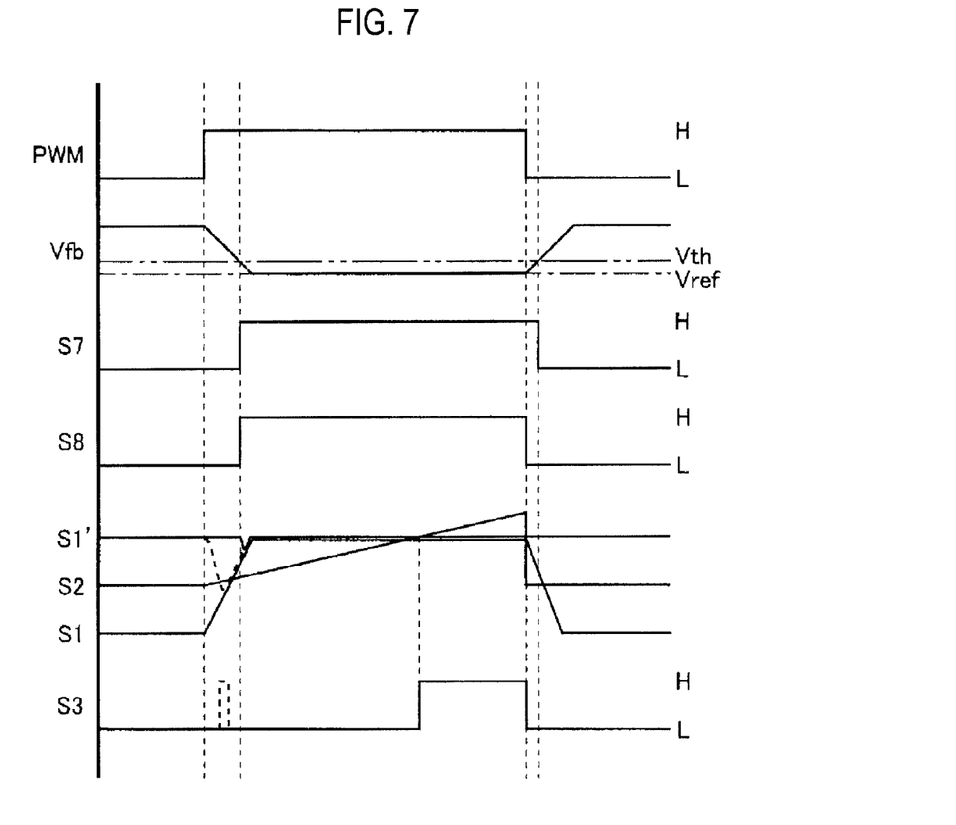
FIG. 7 is a time chart for explaining an effect of suppressing generation of an unnecessary reset pulse.

FIG. 7 is a time chart for explaining an effect of suppressing generation of an unnecessary reset pulse, in which the dimming signal PWM, the feedback voltage Vfb, the comparison signal S7, the sample/hold control signal S8, the sample/hold signal S1', the slope signal S2, the error signal S1, and the reset signal S3 are illustrated in the order above.

In the sample/hold controller 29 of the first configuration example, the sample/hold control signal S8 is increased to a high level to release the hold state of the sample/hold unit 25 when the feedback voltage Vfb is lower than the threshold value Vth. The time when the feedback voltage Vfb becomes lower than the threshold value Vth happens after both the dimming signal PWM and the comparison signal S7 have a high level, namely, after the ON operation of the driving current ILED is instructed. With such a configuration, undershoot generated in the sample/hold signal S1' can be suppressed to be small, preventing the sample/hold signal S1' from being lower than the slope signal S2 unintentionally, whereby generation of an unnecessary pulse of the reset signal S2, and in addition, an unnecessary reset of the switch signal SW can be prevented in advance.

<Mechanism in which Step-Up Level is Unadjustable>

Figure 8:
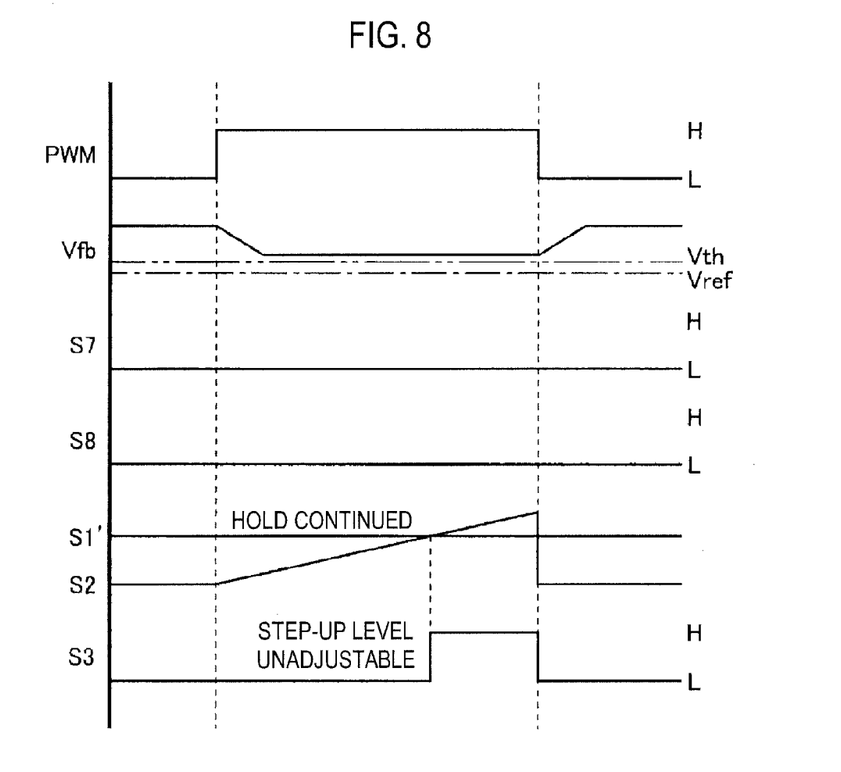
FIG. 8 is a time chart for explaining a mechanism in which a step-up level is unadjustable.

FIG. 8 is a time chart for explaining a mechanism in which a step-up level is unadjustable, in which the dimming signal PWM, the feedback voltage Vfb, the comparison signal S7, the sample/hold control signal S8, the sample/hold signal S1', the slope signal S2, and the reset signal S3 are illustrated in the order above.

As described above, if the sample/hold controller 29 of the first configuration example is used, unnecessary pulse generation of the reset signal S3 can be effectively suppressed. However, when the output voltage Vo is excessively stepped up, it may happen that the feedback voltage Vfb is not lower than the threshold value Vth, even during a high level period of the dimming signal PWM. In this state, since the sample/hold unit 25 is maintained in the hold state, the step-up level cannot be adjusted and the step-up operation continues by a predetermined ON duty. Hereinafter, the sample/hold controller 29 of a second configuration example which reduces such a problem will be described in detail.

Figure 9:
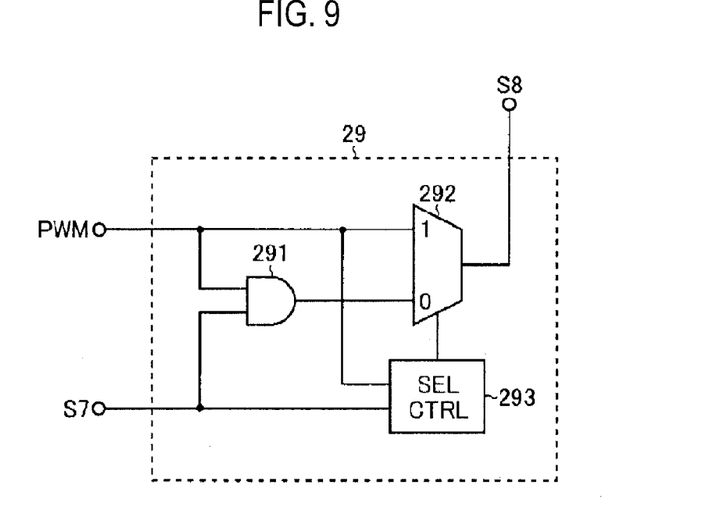
FIG. 9 is a block diagram illustrating a second configuration example of the sample/hold controller.

FIG. 9 is a schematic block diagram illustrating a second configuration example of the sample/hold controller 29. The sample/hold controller 29 of the second configuration example has substantially the same configuration as that of the foregoing first configuration example and is characterized in that a selector controller 293 is newly added. Thus, the same reference numerals in FIG. 9 are used for the same components as those of the first configuration example to omit repeated description, and hereinafter, components particular to the second configuration example will be largely described.

The selector controller 293 is a circuit block for executing path switching controlling of the selector 292 depending on the dimming signal PWM and the comparison signal S7, and in particular, it has a function of determining a hold release timing of a next period based on the dimming signal PWM and the comparison signal S7 of a current period.

Figure 10:
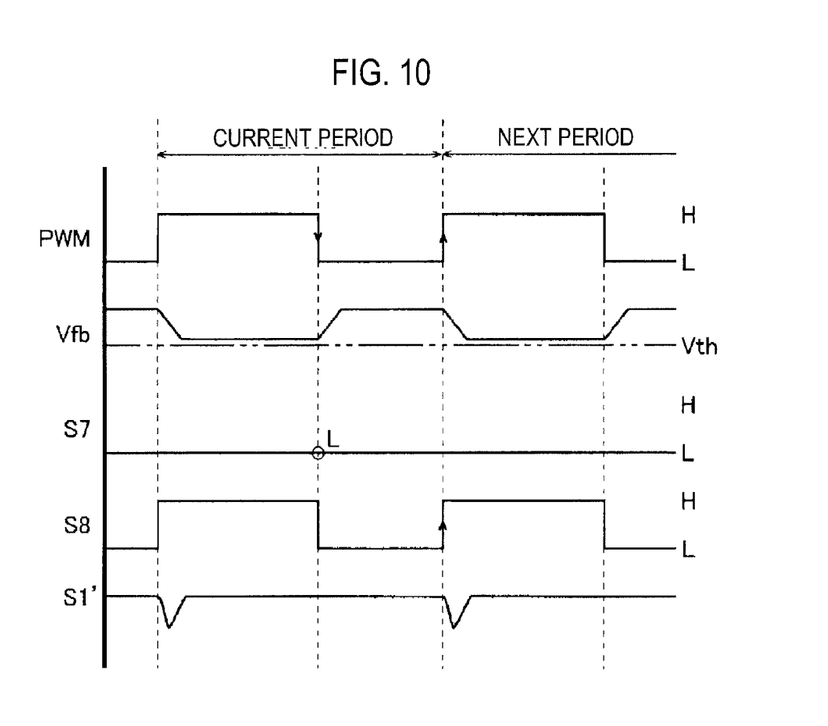
FIG. 10 is a time chart illustrating a first hold release timing.

FIG. 10 is a time chart illustrating a first hold release timing, in which the dimming signal PWM, the feedback voltage Vfb, the comparison signal S7, the sample/hold control signal S8, and the sample/hole signal S1' are illustrated in the order above. As shown in this drawing, in a current period, if the comparison signal S7 has a low level when the dimming signal PWM is reduced to have a low level, the sample/hold controller 293 controls path switching of the selector 292 to release the hold state of the sample/hold unit 25 when the dimming signal PWM is increased to have a high level, rather than following the logical level of the comparison signal S7, in a next period. Namely, in the current period, if the feedback voltage Vfb is not lower than the threshold value Vth when the OFF operation of the driving current ILED is instructed, the sample/hold controller 293 controls path switching of the selector 292 to release the hold state of the sample/hold unit 25 at a point when the ON operation of the driving current ILED is instructed in the next period. According to such path switching controlling, although the feedback voltage Vfb is not lower than the threshold voltage Vth, the hold state of the sample/hold unit 25 can be appropriately released, and thus, the phenomenon that the step-up level of the output voltage Vo is unadjustable does not occur.

Figure 11:
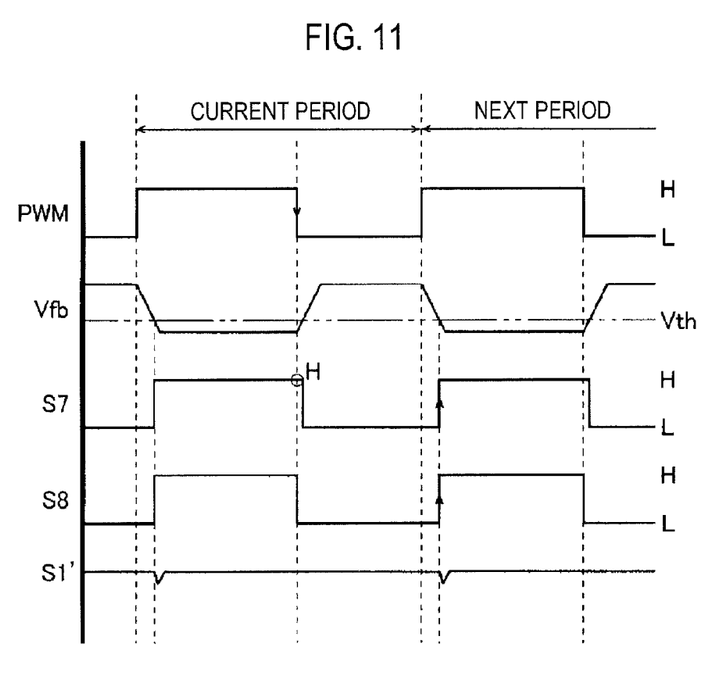
FIG. 11 is a time chart illustrating a second hold release timing.

FIG. 11 is a time chart illustrating a second hold release timing, in which the dimming signal PWM, the feedback voltage Vfb, the comparison signal S7, the sample/hold control signal S8, and the sample/hole signal S1' are illustrated in the order above. As shown in this drawing, in a current period, if the comparison signal S7 has a high level when the dimming signal PWM is reduced to have a low level, the sample/hold controller 293 controls path switching of the selector 292 to release the hold state of the sample/hold unit 25 when both the dimming signal PWM and the comparison signal S7 are increased to have a high level in a next period. Namely, in the current period, if the feedback voltage Vfb is lower than the threshold value Vth when the OFF operation of the driving current ILED is instructed, the sample/hold controller 293 controls path switching of the selector 292 to release the hold state of the sample/hold unit 25 when the feedback voltage Vfb becomes lower than the threshold voltage Vth after the dimming signal PWM is increased to have a high level in the next period. According to such path switching controlling, undershoot generated in the sample/hold signal S1' is suppressed to be small, and thus, unnecessary reset of the switch signal SW can be prevented in advance.

Meanwhile, besides the case in which the output voltage Vo is excessively stepped up, in the LED driving device having a soft start function of a step-up operation, even when the device is initiated (during the soft start period), the feedback voltage Vfb is not lower than the threshold value Vth, causing the step-up level to be unadjustable. In order to avoid this state, whether or not a soft start operation has been completed is monitored by the selector controller 293, and during the soft start period, path switching controlling of the selector 292 may be executed to release the hold state of the sample/hold unit 25 when the dimming signal PWM is increased to have a high level, namely, when the ON operation of the driving current ILED is instructed, rather than following the logical level of the comparison signal S7.

<Other Modifications>

In the above embodiments, the configuration of applying the present disclosure to a LED driving device is taken as an example, and the application subject of the present disclosure is not limited thereto and can be also widely applicable to any other load driving devices (for example, a power circuit for supplying power to a pulse-driven load).

Moreover, besides the above embodiments, the configuration of the present disclosure can be variably modified without departing from major characteristics of the present disclosure. Namely, it is contemplated that the foregoing embodiments are illustrative in all respects, rather than being limited, and the technical scope of the present disclosure is not represented by the description but by the scope of the claims, and it should be understood that all the modifications are included in the meaning and scope equivalent to the claim coverage.

For example, in the foregoing embodiments, the configuration in which the array of a plurality of LEDs arranged in series is a driving target is taken as an example, and the configuration of the present disclosure is not limited thereto, and the number of LEDs in parallel or in series may be appropriately increased or decreased according to a purpose.

The load driving device related to the present disclosure may be used, for example, as an LED driving device for driving a backlight of a liquid crystal monitor.

According to the present disclosure in some embodiments, it is possible to provide a load driving device capable of effectively and stably controlling driving of a load, and an electronic device using the same While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A load driving device comprising:
a switch element configured to generate an output voltage to a load from an input voltage depending on an ON/OFF operation of the switch element;
a switch controller configured to control the ON/OFF operation of the switch element such that a feedback voltage obtained by subtracting a dropped voltage of the load from the output voltage and a predetermined reference voltage are maintained to be consistent; and
a variable current source configured to perform ON/OFF controlling of a driving current flowing to the load in response to a driving current control signal, wherein the variable current source is coupled to the load, and the driving current passed through the load flows through the variable current source, and
wherein the switch element is turned on in synchronization with the driving current, and thereafter, when the switch element is in an ON state at an OFF timing of the driving current, the switch controller maintains the switch element in the ON state and, thereafter, turns off the switch element when an ON period of the switch element reaches a predetermined period.

2. The load driving device of claim 1, wherein the switch controller initiates ON/OFF controlling of the switch element in synchronization with an ON timing of the driving current.

3. The load driving device of claim 2, wherein the switch controller comprises:
an error amplifier configured to generate an error signal depending on a difference between the feedback voltage and the predetermined reference voltage;
a sample/hold unit configured to sample the error signal during an ON period of the driving current and, during an OFF period of the driving current, hold a value of an error signal sampled immediately before the driving current is turned OFF;
an oscillator configured to generate a slope signal, a set signal, and a duty lock signal at a predetermined driving period;
a first comparator configured to compare an output signal from the sample/hold unit and the slope signal to generate a reset signal; and
an RS flip-flop configured to generate a switch signal depending on the set signal, the reset signal, and the duty lock signal and supply the generated switch signal to the switch element.

4. The load driving device of claim 3, wherein the RS flip-flop sets the switch signal to an ON logical level according to a pulse edge of the set signal, and resets the switch signal to an OFF logical level according to one of pulse edges of the reset signal and the duty lock signal.

5. The load driving device of claim 4, wherein the oscillator initiates generation of the slope signal, the set signal, and the duty lock signal in synchronization with the ON timing of the driving current.

6. The load driving device of claim 5, wherein the oscillator stops pulse generation of the set signal in synchronization with the OFF timing of the driving current, and executes pulse generation of a next period with respect to the duty lock signal, and then stops the pulse generation.

7. The load driving device of claim 6, wherein the switch controller further comprises:
a second comparator configured to generate a comparison signal indicating whether the feedback voltage is lower than a predetermined threshold voltage; and
a sample/hold controller configured to control the operation of the sample/hold unit depending on the driving current control signal and the comparison signal.

8. The load driving device of claim 7, wherein the sample/hold controller releases a hold state of the sample/hold unit at a point in time when the feedback voltage is lower than the predetermined threshold voltage after an ON operation of the driving current is instructed.

9. The load driving device of claim 8, wherein if the feedback voltage is not lower than the predetermined threshold voltage when an OFF operation of the driving current is instructed in a current period, the sample/hold controller releases the hold state of the sample/hold unit at a point in time when the ON operation of the driving current is instructed in a next period, and if the feedback voltage is lower than the predetermined threshold voltage when the OFF operation of the driving current is instructed in the current period, the sample/hold controller releases the hold state of the sample/hold unit at a point in time when the feedback voltage is lower than the predetermined threshold voltage after the ON operation of the driving current is instructed in the next period.

10. An electronic device comprising a load, and the load driving device of claim 1 for controlling driving of the load.

11. The electronic device of claim 10, wherein the load is a light emitting diode.

* * * * *